US009520962B2

(12) United States Patent
Xia et al.

(10) Patent No.: US 9,520,962 B2
(45) Date of Patent: Dec. 13, 2016

(54) SUSPENSION OF TRAFFIC RE-ROUTING DURING PLANNED NETWORK INTERRUPTION

(71) Applicant: Verizon Patent and Licensing Inc., Arlington, TX (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 14/584,138

(22) Filed: Dec. 29, 2014

(65) Prior Publication Data
US 2016/0191346 A1    Jun. 30, 2016

(51) Int. Cl.
*H04B 10/00* (2013.01)
*H04J 14/02* (2006.01)
*H04L 12/24* (2006.01)

(52) U.S. Cl.
CPC ........ *H04J 14/0293* (2013.01); *H04J 14/0202* (2013.01); *H04J 14/0227* (2013.01); *H04L 41/0627* (2013.01); *H04L 41/0681* (2013.01)

(58) Field of Classification Search
USPC ............................................. 398/1–9, 58–72
See application file for complete search history.

(56) References Cited

U.S. PATENT DOCUMENTS

| | | | | |
|---|---|---|---|---|
| 7,046,929 B1* | 5/2006 | Hester | ............... | H04B 10/0771 398/1 |
| 7,058,301 B2* | 6/2006 | Bosloy | ............... | H04J 14/0221 359/337.12 |
| 7,113,698 B1* | 9/2006 | Ryhorchuk | ........ | H04B 10/0771 370/216 |
| 7,680,128 B2* | 3/2010 | Nisar | ................... | H04J 3/1617 370/235 |
| 8,391,707 B2* | 3/2013 | Wellbrock | .......... | H04J 14/0279 370/216 |
| 8,509,616 B2* | 8/2013 | Julien | ................... | H04L 49/557 398/141 |
| 8,638,667 B2* | 1/2014 | Shaffer | ................. | H04L 12/569 370/235 |
| 8,639,113 B2* | 1/2014 | DeCusatis | ........... | H04J 14/0287 398/43 |
| 8,966,039 B1* | 2/2015 | Fultz | ....................... | G06F 11/00 709/223 |
| 9,104,999 B2* | 8/2015 | Kim | ................. | G06Q 10/06375 |
| 2011/0055239 A1* | 3/2011 | Wolf | ................. | G06F 17/30516 707/759 |
| 2011/0116789 A1* | 5/2011 | Wellbrock | .......... | H04J 14/0279 398/5 |

(Continued)

*Primary Examiner* — Agustin Bello (57) ABSTRACT

A transport management system receives a request for a planned interruption in an optical network, and identifies transport equipment of the optical network affected by the planned interruption. The transport management system selectively sends a notification, from the network device, the identified transport equipment affected by the planned interruption, including a scheduled time of the planned interruption and a duration associated with the planned interruption, where the notification enables the notified transport equipment to buffer data to be transmitted on links affected by the planned interruption for the notified duration of the planned interruption.

20 Claims, 10 Drawing Sheets

(56) References Cited

U.S. PATENT DOCUMENTS

| | | | |
|---|---|---|---|
| 2013/0010798 A1* | 1/2013 | Shaffer | H04L 12/569 370/395.42 |
| 2014/0105027 A1* | 4/2014 | Shaffer | H04L 12/569 370/236 |
| 2014/0314096 A1* | 10/2014 | Hui | H04L 45/22 370/400 |

* cited by examiner

SUSPENSION OF TRAFFIC RE-ROUTING DURING PLANNED NETWORK INTERRUPTION

BACKGROUND

Optical networks employing 10 gigabit Ethernet (10GE) transport Ethernet frames at a rate of 10 gigabits per second. A router in such an optical network typically includes multiple client interfaces, each of which uses a single optical carrier (e.g., light of a single wavelength) for receiving and/or transmitting data. Transport equipment connects to the router via multiple client interfaces, which each use the single optical carrier, to receive data transmitted from the client interfaces of the router. The transport equipment may further include multiple transport cards, each of which transmits outgoing data over a single optical carrier. The transport equipment sends the data via the single optical carriers to destination transport nodes in the optical network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A transport management system, described herein, sends notifications to transport equipment in an optical network for the purpose of suspending the re-routing of traffic over links in the network that are affected by planned network interruptions. The transport management system receives information related the planned interruptions in the optical network, where the information includes a scheduled time and scheduled duration of the network interruption. The planned interruptions within the optical network may include, for example, temporary continuity breaks in network links, temporary shutdown or disconnection of components along network links, the disabling or adjustment of certain optical carriers over the network links, and/or insertion or removal of components along network links. The scheduled duration of the planned interruption may include a relatively short interruption. The transport management system identifies particular transport equipment in the optical network affected by the planned network interruption, and sends a notification to the identified transport equipment that includes the scheduled time and duration of the network interruption.

Upon receipt of the notification, the identified transport equipment, including its client interfaces and transport cards, buffer data traffic to be carried over links associated with the planned network interruption, but otherwise continue to communicate with connected routers as if no network interruption has occurred. This continued communication may include sending "dummy" data blocks from the client interfaces of the transport equipment to the client interfaces of the routers such that the routers do not perceive any network interruption and do not engage in costly re-routing at the Internet Protocol (IP) or Multi-Protocol Label Switching (MPLS) level during the relatively short interruption in the optical network. Once the scheduled interruption is over, the client interfaces and/or transport cards of the affected transport equipment retrieve buffered data traffic, and resume transmission of optical signals corresponding to the buffered data traffic.

Figure 1:
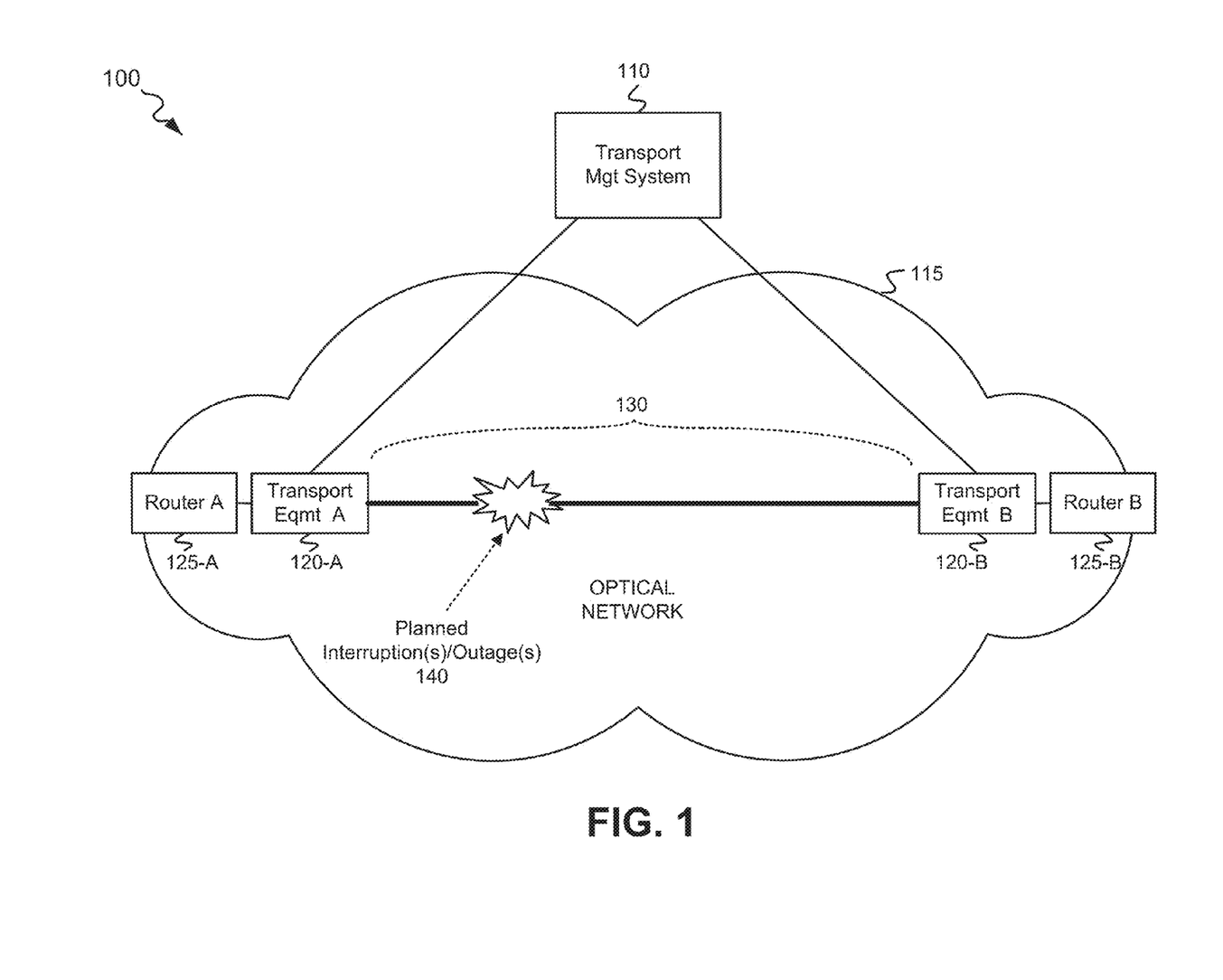
FIG. 1 is a diagram that depicts an exemplary network environment in which a transport management system receives information related to planned interruptions in an optical network and notifies transport equipment of the planned interruptions.

FIG. 1 is a diagram that depicts an exemplary network environment 100 in which a transport management system 110 may receive information related to scheduled interruptions in an optical network, and may notify transport equipment of the scheduled interruptions, as described in further detail herein. As shown, network environment 100 may include transport management (Mgt) system 110 and optical network 115. As further shown in FIG. 1, optical network 115 may include a transport equipment (Eqmt) A 120-A and a router A 125-A at one location in optical network 115, and a transport equipment B 120-B and a router B 125-B at another location in optical network 115. An intervening link(s) 130 may connect transport equipment A 120-A and transport equipment B 120-B. Link(s) 130 may include a single link, multiple links connected in series (possibly with other components, such as optical amplifiers also connected in series), or multiple links connected in a network of links. Each link 130 may include, for example, an optical fiber cable that carries optical signals via one or more optical carriers.

Optical network 115 may include multiple links 130 that carry multiple optical carriers, where the multiple optical carriers include light of multiple different wavelengths, such as multiple wavelengths $\lambda_1$ through $\lambda_n$ (where n is an integer greater than or equal to 2). Router A 125-A and router B 125-B (generically and individually referred to herein as "router 125" or collectively referred to herein as "routers 125") may route and switch incoming data traffic via multiple different optical carriers (e.g., optical wavelengths) and via different client interfaces directed towards specific destinations in optical network 115. Routers 125 may connect to data traffic sources or destination end nodes (not shown in FIG. 1) via optical fiber cables and/or electrical cables (e.g., coaxial cables). Each router 125 may receive data traffic, either via electrical or optical transmission, and may use routing algorithms for routing the data traffic towards its destination as multiple optical carrier (e.g., multiple wavelength) optical signals via multiple client interfaces. Each router 125 may additionally queue, buffer, route and/or switch the received data traffic based on instructions received from transport management system 110, as further described below.

Transport equipment A 120-A and transport equipment B 120-B (generically and individually referred to herein as "transport equipment 120" or collectively referred to herein as "transport equipment 120") may include components, as described in further detail with respect to FIG. 2 below, for transporting switched optical signals, containing data traffic, received from router A 125-A or router B 125-B and multiplexing those optical signals, via multiple optical carriers, onto one or more links (e.g., optical fiber cables).

Transport equipment 120 may include, as described further below with respect to FIG. 2, multiple client interfaces for receiving data traffic via multiple optical carrier optical signals, and multiple transport cards for transmitting the data traffic via multiple optical carrier optical signals to a respective Reconfigurable Optical Add-Drop Multiplexer (ROADM) (not shown in FIG. 1). Transport equipment 120 may receive, buffer, and transmit the data traffic via the multi-wavelength optical signals based on instructions from transport management system 110, as further described below.

Transport management system 110 may include a network device that receives information associated with planned interruptions of network service within optical network 115. The information may be received at transport management system 110 via, for example, manual input by an operator, or automatically as part of an electronic network management plan. The planned interruptions within optical network 115 may include, for example, temporary continuity breaks in link(s) 130, temporary shutdown or disconnection of components along link(s) 130, the disabling or adjustment of certain optical carriers (e.g., wavelengths) over link(s) 130, and/or insertion or removal of components along link(s) 130 (e.g., remove and replace a length of optical fiber).

Transport management system 110 may connect to transport equipment 120 of optical network 115 via, for example, one or more networks (not shown in FIG. 1) that are different from optical network 115. For example, the one or more different networks may include one or more of a Public Switched Telephone Network (PSTN), a wireless network, a local area network (LAN), a wide area network (WAN), a metropolitan area network (MAN), an intranet, or the Internet. The wireless network may include a satellite network, a Public Land Mobile Network (PLMN), or a wireless LAN or WAN (e.g., Wi-Fi). Transport management system 110 is depicted with a direct connection to each of transport equipment 120-A and 120-B for purposes of simplicity.

The configuration of components of network environment 100 illustrated in FIG. 1 is for illustrative purposes. Other configurations may be implemented. Therefore, network environment 100 may include additional, fewer and/or different components that may be configured in a different arrangement from that depicted in FIG. 1. For example, though two routers 125-A and 125-B, and two transport equipment 120-A and 120-B, are shown in FIG. 1, optical network 115 may include multiple different routers 125 and transport equipment 120.

Figure 2:
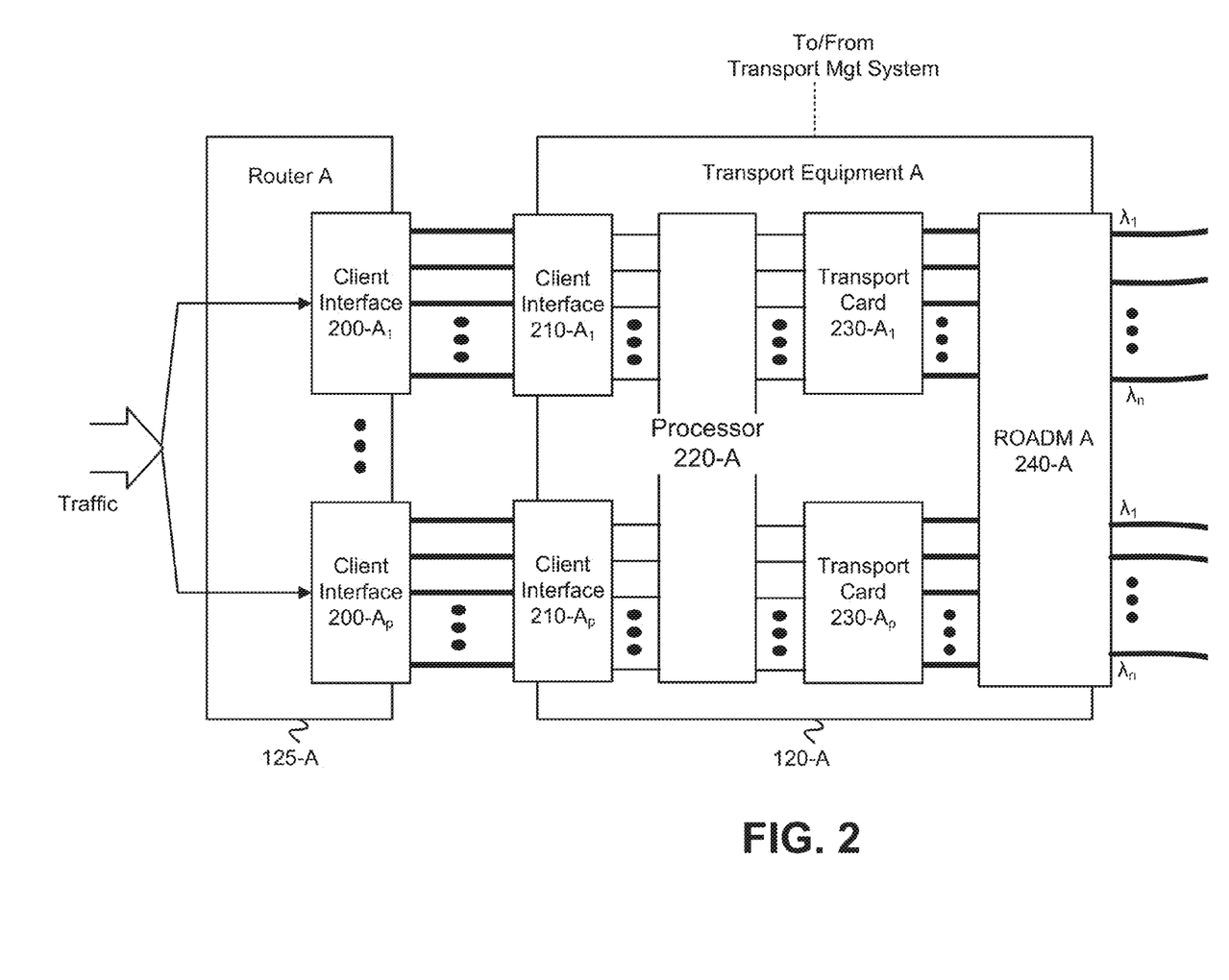
FIG. 2 is a diagram that depicts exemplary components of a router interconnected with a transport equipment of FIG. 1.

FIG. 2 is a diagram that depicts exemplary components of router A 125-A interconnected with transport equipment A 120-A. As shown, router A 125-A may include multiple client interfaces 200-$A_1$ through 200-$A_p$ (where p is a positive integer greater than one) interconnected via optical fibers with respective client interfaces 210-$A_1$ through 210-$A_p$ of transport equipment A 120-A. Transport equipment A 120-A may additionally include a processor 220-A, multiple transport cards 230-$A_1$ through 230-$A_p$, and a ROADM A 240-A. Router B 125-B and transport equipment B 120-B may be interconnected similarly, and have a similar configuration of components, as that shown in FIG. 2.

Each client interface 200 of router A 125 transmits optical signals corresponding to routed, outgoing data traffic, and receives optical signals corresponding to incoming data traffic, via multiple optical carriers over multiple optical fibers. For example, client interface 200-$A_1$ transmits and receives optical signals corresponding to data traffic via optical carriers of wavelengths $\lambda_1$-$\lambda_n$.

Client interfaces 210-$A_1$ through 210-$A_p$ of transport equipment A 120-A include circuitry and optical components for receiving optical signals from a respective client interface 200 of router A, and for transmitting optical signals to the respective client interface 200 of router A. Each client interface 210 converts received optical signals from a respective client interface 200 of router A into digital data for processing by processor 220-A. Each client interface 210 additionally converts data traffic received from processor 220-A and a respective transport card 230 into outgoing optical signals for transmission to a respective client interface 200 of router A 125-A.

Processor 220-A may include one or more processors for controlling the buffering, and other processing, of data traffic received from client interfaces 210-$A_1$ through 210-$A_p$ and from transport cards 230-$A_1$ through 230-$A_p$.

Each one of transport cards 230-A1 through 230-Ap includes circuitry and optical components for receiving optical signals from ROADM A 240-A and converting the received optical signals to corresponding electrical, digital data traffic, and converting the electrical, digital data traffic received from processor 220-A to optical signals for transmission to ROADM A 240-A.

Each ROADM 240 may include any type of ROADM for multiplexing and demultiplexing data traffic carried via multiple optical carriers (e.g., multiple wavelengths). Each ROADM 240 may include, for example, a Planar Lightwave Circuit (PLC), a Wavelength Selective Switch (WSS) or a Wavelength Crossconnect (WXC) ROADM. Each ROADM 240 may multiplex or demultiplex the data traffic via the multiple optical carrier optical signals based on instructions from an external transport card/ROADM management system (not shown).

Figure 3:
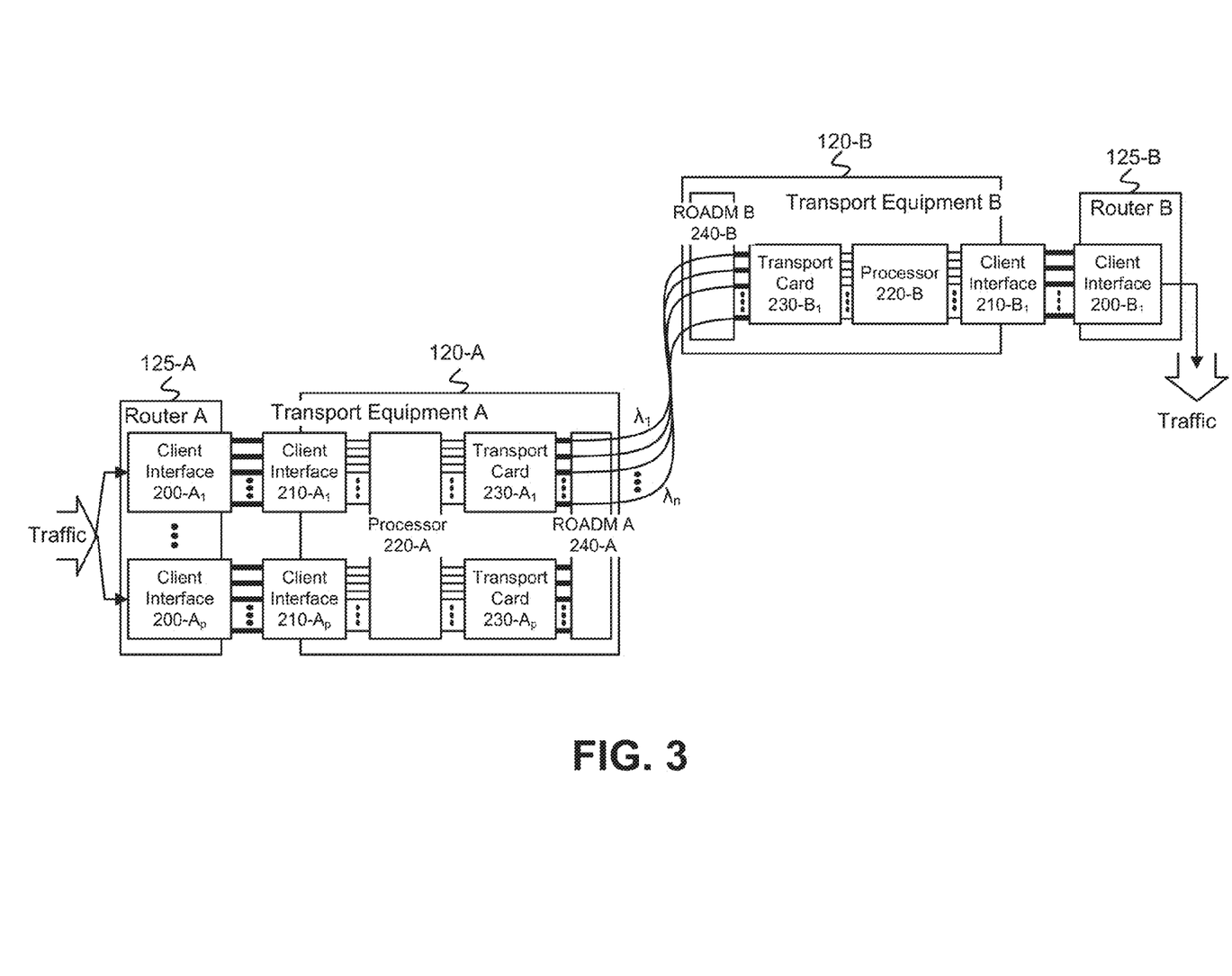
FIG. 3 is a diagram that depicts an exemplary interconnection of transport equipment via optical fiber cables of the optical network for transmission of optical signals via multiple different optical carriers.

FIG. 3 is a diagram that depicts an exemplary interconnection of transport equipment 120-A and 120-B via optical fiber cables of optical network 115 for transmission of optical signals via multiple different optical carriers (e.g., wavelengths $\lambda_1$-$\lambda_n$). As shown in FIG. 3, router A 125-A may have multiple client interfaces 200-$A_1$ through 200-$A_p$ (where p is an integer greater than or equal to 2). Transport equipment A 130-A may have multiple client interfaces 210-$A_1$ through 210-$A_p$ and multiple transport cards 230-$A_1$ through 230-$A_p$. Each client interface and transport card of router 125-A and transport equipment 120-A transports multiple optical carriers (e.g., wavelengths $\lambda_1$ through $\lambda_n$). Transport equipment B 120-B and router B 125-B may be similarly configured, with similar components, to transport equipment A 120-A and router A 125-A. For purposes of simplicity, FIG. 3 depicts transport equipment 120-B as including only ROADM B 240-B, transport card B 230-$B_1$, processor 220-B, and client interface 200-$B_1$; and router B 125-B is shown as including only a single client interface 200-$B_1$. Transport equipment B 120-B may include multiple transport cards 230 and multiple client interfaces 210, and router B 125-B may include multiple client interfaces 200 similar to those depicted for transport equipment A 120-A and router A 125-A.

In the single direction of data traffic transmission shown in FIG. 3, incoming data traffic is routed by router 125-A for transmission at client interfaces 200-$A_1$ through 200-$A_p$ towards destination transport equipment 120. Client interfaces 200-$A_1$ through 200-$A_p$ may include interface circuitry and optical components for transmitting the data traffic as optical signals via multiple different optical carriers (e.g., wavelengths $\lambda_1$-$\lambda_n$). For example, if router A 125-A supports 8 different optical wavelengths (n=8), then each of client interfaces 200-$A_1$ through 200-$A_p$ may transmit optical signals via the 8 different optical wavelengths.

Client interfaces 210-$A_1$ through 210-$A_p$ of transport equipment A 120-A may include optical components and circuitry for receiving the optical signals, via multiple different optical carriers (e.g., wavelengths), from a respective client interface 200 of router A 125-A and may convert the optical signals to electrical signals. Processor 220-A may process and then supply the electrical signals to respective ones of transport cards 230-$A_1$ through 230-$A_p$. Transport cards 230-$A_1$ through 230-$A_p$ may include circuitry and optical components for converting the electrical signals, corresponding to the data traffic, to optical signals transmitted via one or more optical carriers (e.g., wavelengths) of multiple optical carriers, and for transmitting the optical signals to ROADM A 240-A. ROADM A 240-A may, based on switching control instructions received from a control system (not shown in FIG. 3), selectively switch each optical carrier (e.g., wavelength) carrying optical signals corresponding to the data traffic on outgoing optical fibers to, for example, destination transport equipment 120-B. In the example depicted in FIG. 3, ROADM A 240-A is shown as transmitting optical signals via optical wavelengths $\lambda_1$-$\lambda_n$ on optical fibers to transport equipment 120-B. In actual implementation, ROADM A 240-A may further transmit optical signals via optical wavelengths $\lambda_1$-$\lambda_n$ on optical fibers to p-1 other destination transport equipment (not shown). For example, ROADM A 240-A may transmit optical signals on optical fibers to transport equipment 120-C, 120-D, 120-E (not shown), etc.

Upon receipt of the optical signals, via n different optical carriers (e.g., wavelengths), at transport node 120-B, ROADM B 240-B switches the signals to transport card 230-$B_1$. Transport card 230-$B_1$ includes optical components and circuitry for receiving the optical signals, via the n different optical carriers (e.g., wavelengths), from ROADM A 240-A, converts the optical signals to electrical signals, and supplies the electrical signals to client interface 210-$B_1$ via processor 220-B.

Client interface 210-$B_1$ of transport equipment B 120-B may include circuitry and optical components for receiving the electrical signals, and converting the electrical signals to optical signals, corresponding to the data traffic, for transmission to client interface 200-$B_1$ of router B 125-B. Router B 125-B may receive the optical signals as outgoing data traffic, and may, based on existing routing algorithms and also based on instructions from a control system (not shown), queue, route and/or switch the data traffic to an outgoing client interface (not shown) for transmission to a next transport equipment in optical network 115, or to a network endpoint for delivery to a destination of the data traffic.

Figure 4:
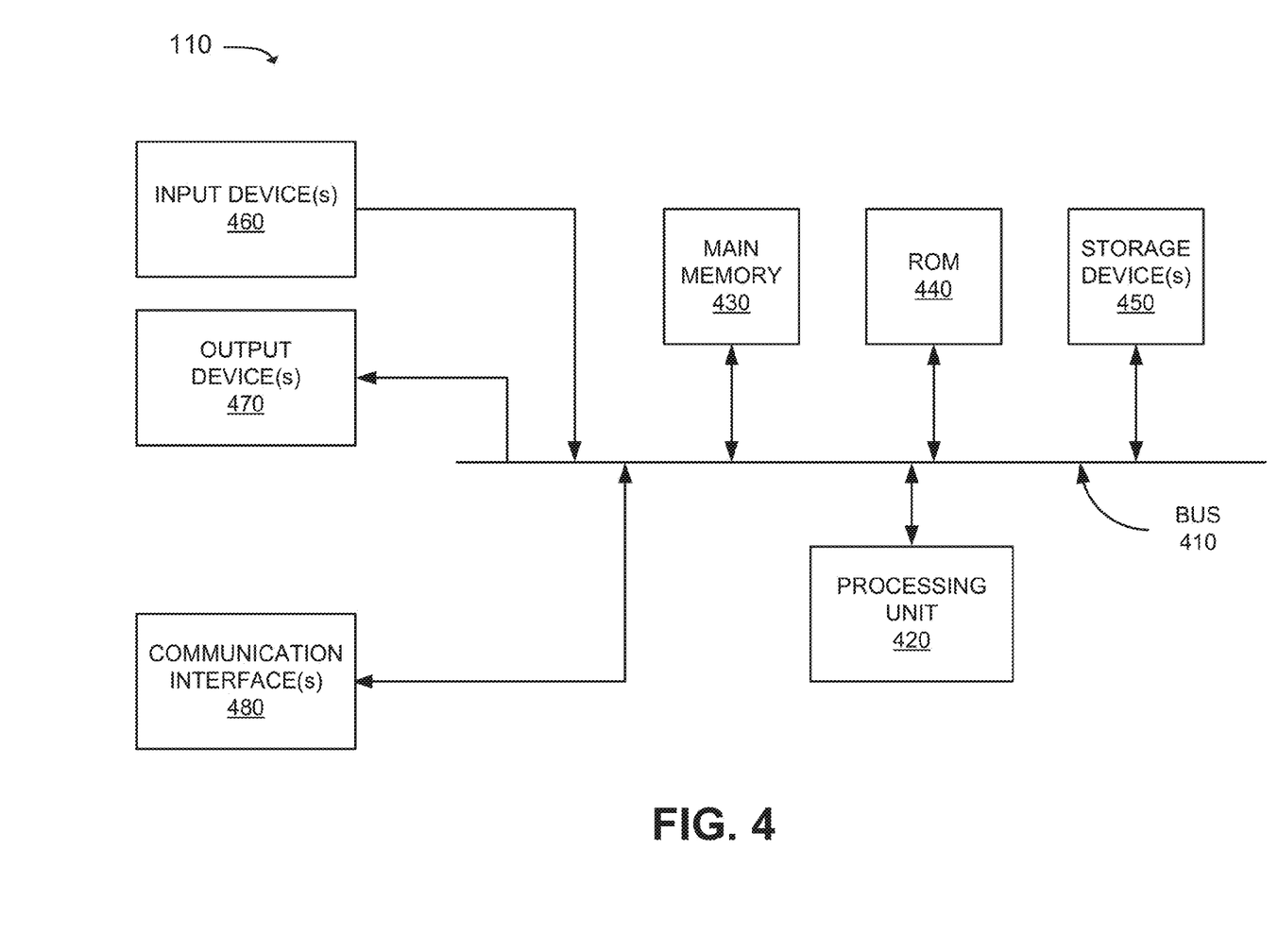
FIG. 4 is a diagram that depicts exemplary components of the transport management system of FIG. 1.

FIG. 4 is a diagram that depicts exemplary components of a transport management system 110. Transport management system 110 may include a bus 410, a processing unit 420, a main memory 430, a read only memory (ROM) 440, a storage device(s) 450, an input device(s) 460, an output device(s) 470, and a communication interface(s) 480. Bus 410 may include a path that permits communication among the elements of transport management system 110.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. Read Only Memory (ROM) 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium."

Input device 460 may include one or more mechanisms that permit an operator (or user) to input information to transport management system 110, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface(s) 480 may include a transceiver that enables transport management system 110 to communicate with other devices and/or systems. For example, communication interface(s) 480 may include a wired or wireless transceiver for communicating with transport equipment 120, possibly via an intervening network (not shown).

The configuration of components of transport management system 110 illustrated in FIG. 4 is for illustrative purposes only. Other configurations may be implemented. Therefore, transport management system 110 may include additional, fewer and/or different components, or differently arranged components, from those depicted in FIG. 4.

Figure 5:
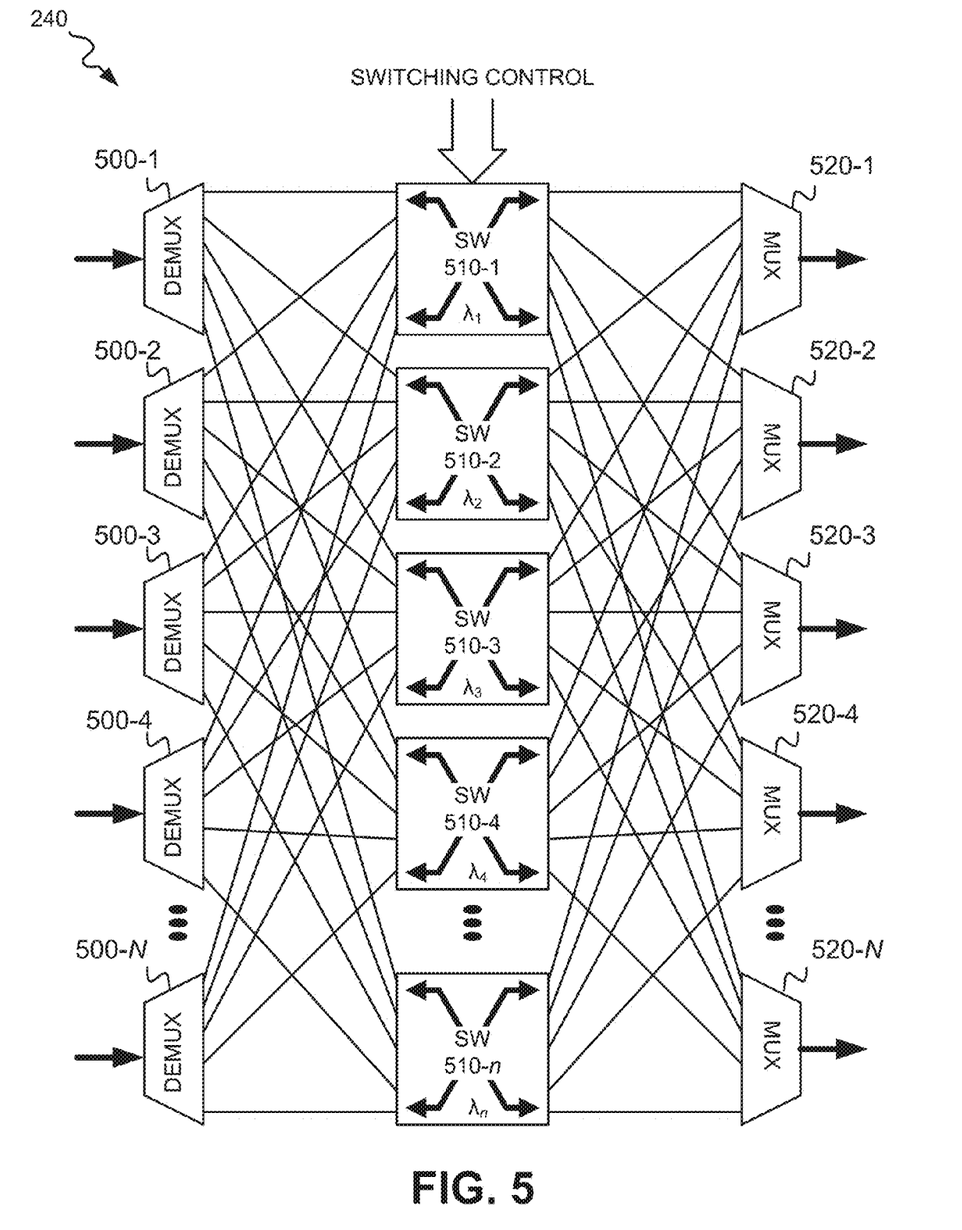
FIG. 5 depicts a Reconfigurable Optical Add/Drop Multiplexer according to an exemplary implementation.

FIG. 5 depicts ROADM 240 according to an exemplary implementation. In the exemplary implementation of FIG. 5, ROADM 240 includes a Wavelength Crossconnect (WXC) type of ROADM. In other implementations, ROADM 240 may include other types of ROADMs such as, for example, a Planar Lightwave Circuit (PLC) ROADM or a Wavelength Selective Switch (WSS) ROADM. The WXC type of ROADM depicted in FIG. 5 provides N×N connectivity. For a degree N-1 node and n wavelengths per fiber, the WXC type of ROADM uses N demultiplexers, N Multiplexers, and n N×N switches.

ROADM 240 may include multiple optical demultiplexers 500-1 through 500-N, multiple optical switches 510-1 through 510-n, and multiple optical multiplexers 520-1 through 520-N. Each of demultiplexers 500-1 through 500-N (generically referred to herein as a "demultiplexer 500") receive optical signals carried by multiple optical carriers (e.g., wavelengths $\lambda_1$ through $\lambda_n$) over an optical fiber (as depicted by the bold arrows at the left-hand side of FIG. 5). Demultiplexer 500 demultiplexes the multiple optical wavelengths into single output wavelengths and outputs each wavelength $\lambda$ to its respective switch of switches 510-1 through 510-n. For example, demultiplexer 500-1 demultiplexes optical signals on each of wavelengths $\lambda_1$ through $\lambda_n$ and sends optical signals for wavelength $\lambda_1$ to switch 510-1, optical signals for wavelength $\lambda_2$ to switch 510-2, etc.

Switches 510-1 through 510-n (generically and individually referred to herein as a "switch 510") may receive optical signals carried on a single optical wavelength from each of demultiplexers 500-1 through 500-N, and may switch the optical signals to one of multiplexers 520-1 through 520-N based on switching control instructions. Each switch 510 operates on a single optical wavelength and switches optical signals carried on that optical wavelength from any input port to any output port. For example, switch 510-1 may switch optical signals received on wavelength $\lambda_1$ from demultiplexer 500-1 to multiplexer 520-N for output on an optical fiber from ROADM 240. As another example, switch 510-4 may switch optical signals received on wavelength $\lambda_4$ from demultiplexer 500-3 to multiplexer 520-1 for output on an optical fiber from ROADM 240. Each of multiplexers 520-1 through 520-N (generically referred to herein as "multiplexer 520") may multiplex optical signals carried on one or more different wavelengths, received from switches 510-1 through 510-$n$, for output to an optical fiber.

The configuration of components of ROADM 240 illustrated in FIG. 5 is for illustrative purposes only. Other configurations may be implemented. Therefore, ROADM 240 may include additional, fewer and/or different components, or differently arranged components, than those depicted in FIG. 5. For example, ROADM 240 may alternatively include a PLC ROADM or a WSS ROADM.

Figure 6:
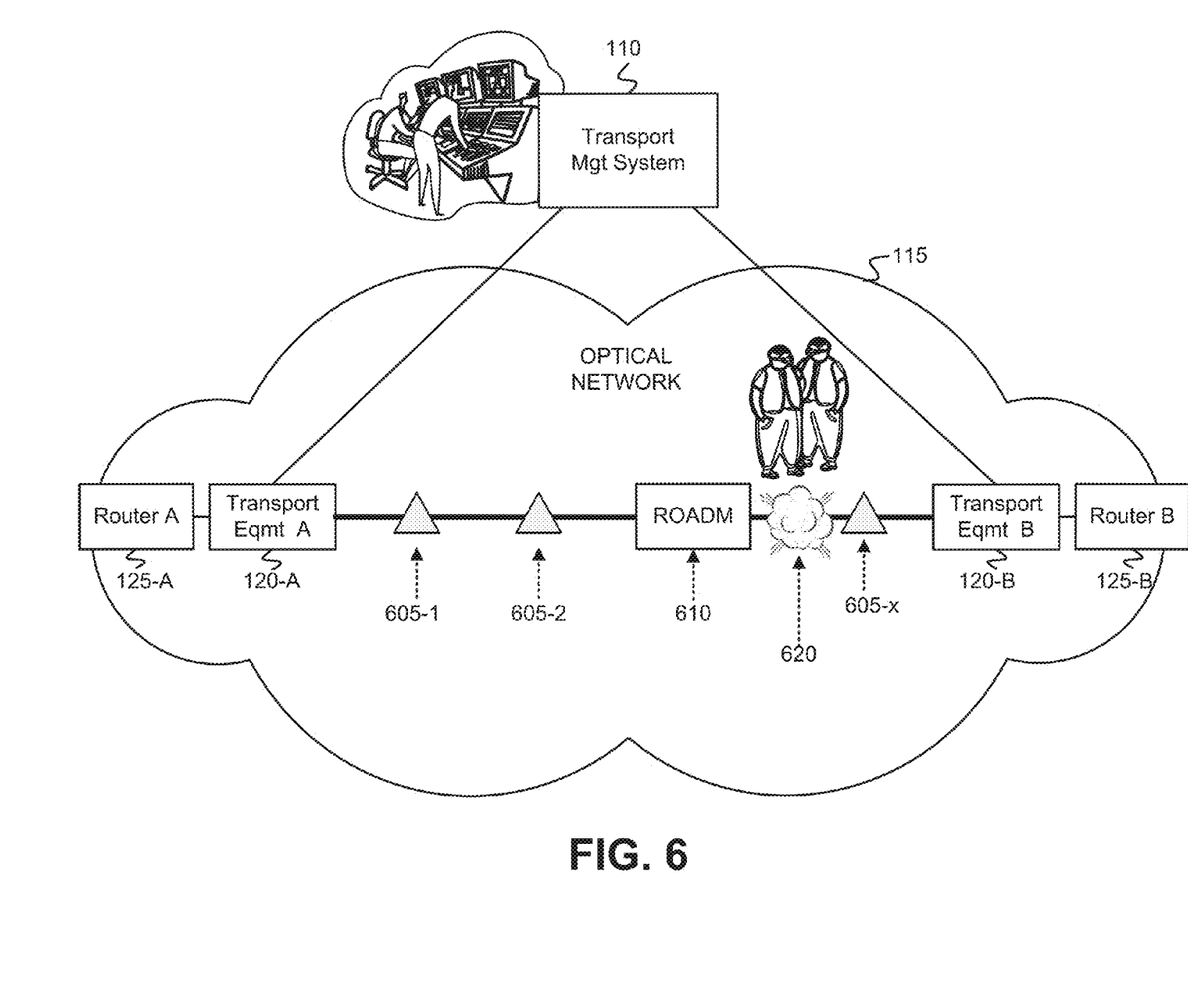
FIGS. 6-8 depict specific examples of planned interruptions in network service in the optical network that may occur at a particular scheduled time and for a particular scheduled duration.
Figure 7:
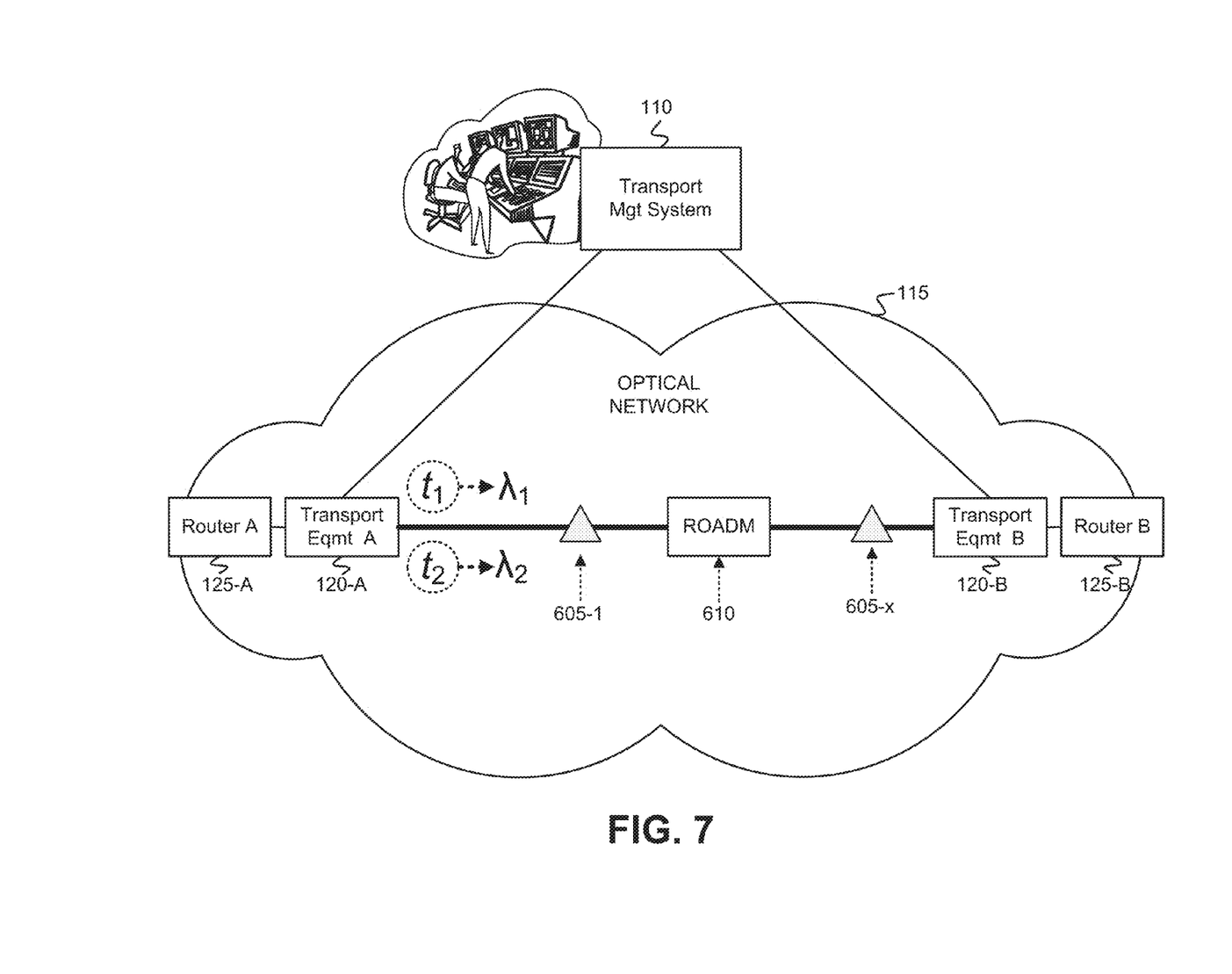
Figure 8:
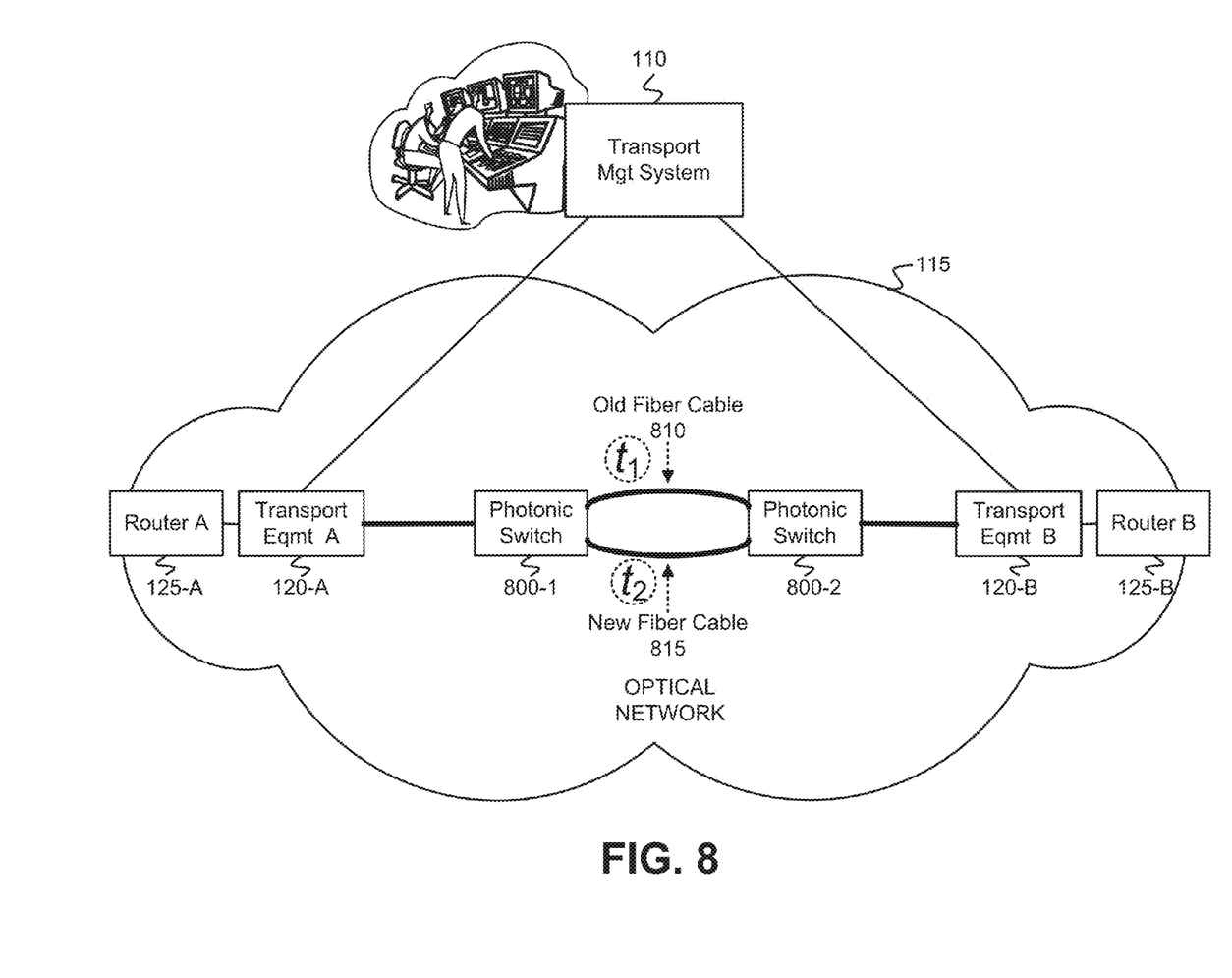

FIGS. 6-8 depict some specific examples of planned interruptions in network service in optical network 115 that may occur at a particular scheduled time and for a particular scheduled duration. In FIG. 6, the planned interruption includes a temporary disconnection of components along a series of links between transport equipment A 120-A and transport equipment B 120-B. As shown in FIG. 6, the series of links may include optical fibers connecting optical amplifiers 605-1 through 605-$x$ and a ROADM 610, with the planned interruption including a temporary disconnection 620 along the series of links preventing signal continuity between transport equipment A 120-A and transport equipment B 120-B. With this planned interruption, transport management system 110 sends a notification to each of transport equipment A 120-A and transport equipment B 120-B such that when a signal loss on the respective optical link is seen by a respective transport card 230, processor 220 and/or client interface 210, no corresponding notification of the loss of signal is sent to a client interface 200 of router 125 and, therefore, router 125 has no knowledge of the interruption and does not re-route data traffic to be sent via the affected optical link(s).

In FIG. 7, the planned interruption includes the adjustment of optical carriers (e.g., wavelengths) over the series of links interconnecting transport equipment A 120-A and transport equipment B 120-B, where, during the optical carrier adjustment, an interruption in optical signal transmission occurs temporarily over the series of links. As shown in FIG. 7, the series of links may include, similar to FIG. 6, optical fibers connecting optical amplifiers 605-1 through 605-$x$ and a ROADM 610, with the planned interruption including an adjustment of an optical carrier from a first wavelength ($\lambda_1$) to a second wavelength ($\lambda_2$) at, for example, a transceiver of transport card 230-A of transport equipment 120-A and, across the series of links shown in FIG. 7, at a corresponding transceiver of transport card 230-B of transport equipment 120-B. During the optical carrier adjustment, signal continuity is temporarily lost at the first wavelength over the series of links. Transport management system 110 sends a notification to each of transport equipment A 120-A and transport equipment B 120-B of the optical carrier adjustment such that the transport equipment "shuts down" the first wavelength ($\lambda_1$) at a scheduled time ($t_1$) causing a signal loss on the respective optical link as seen by the respective transport card 230, processor 220 and/or client interface 210. In response to receipt of the notification, no corresponding notification of the loss of signal is sent from the notified transport equipment 120 to a client interface 200 of router 125 and, therefore, router 125 has no knowledge of the interruption and does not re-route data traffic to be sent via the affected optical link(s) during the adjustment of the optical carrier.

Once the transceiver at the transport card 230 of transport equipment 120 has completed the adjustment to the new wavelength ($\lambda_2$) at the scheduled time ($t_2$), then the transmission of optical signals across the optical link(s) between the transceiver of transport card 230-A of transport equipment 120-A and the corresponding transceiver of transport card 230-B of transport equipment 120-B resumes. Transport equipment 120-A and 120-B may, upon expiration of the scheduled duration of the planned interruption, or upon expiration of a determined loss of signal duration associated with the planned interruption, retrieve buffered data traffic from storage, and may send the retrieved data traffic via the new optical carrier (e.g., wavelength $\lambda_2$).

In FIG. 8, the planned interruption includes the replacement of an old optical fiber cable with a new optical fiber cable along the series of links interconnecting transport equipment A 120-A and transport equipment B 120-B, where, during the replacement, an interruption in optical signal transmission occurs temporarily due to a break in signal path continuity. As shown in FIG. 8, the transport path between transport equipment A 120-A and transport equipment B 120-B includes optical fiber cables interconnecting a first photonic switch 800-1 and a second photonic switch 800-2 with transport equipment A 120-A and transport equipment B 120-B. In the example of FIG. 8, the planned interruption includes the disconnection of an old optical fiber cable 810 at scheduled time ($t_1$) and replacement of old optical fiber cable 810 with a new optical fiber cable 815 at scheduled time ($t_2$) that is reconnected between photonic switches 800-1 and 800-2. During the optical fiber cable replacement, signal continuity is temporarily lost over the link between photonic switch 800-1 and photonic switch 800-2. The loss of signal continuity on the link results in perception of a signal loss on the link as seen by the respective transport card 230, processor 220 and/or client interface 210 of transport equipment 120.

Transport management system 110 sends a notification to each of transport equipment A 120-A and transport equipment B 120-B of the scheduled time ($t_1$) of the fiber replacement, and the scheduled duration (D) of the fiber replacement (where $t_2$ equals $t_1$+D). In response to receipt of the notification, no corresponding notification of the loss of signal is sent, during the scheduled duration (D), from the notified transport equipment 120 to a client interface 200 of router 125 and, therefore, router 125 has no knowledge of the interruption and does not re-route data traffic to be sent via the affected optical link(s) during the adjustment of the optical carrier.

Once new optical fiber cable 815 has been connected between photonic switches 800-1 and 800-2, then the transmission of optical signals across the optical link(s) between the transceiver of transport card 230-A of transport equipment 120-A and the corresponding transceiver of transport card 230-B of transport equipment 120-B resumes. Transport equipment 120-A and 120-B may, upon expiration of the scheduled duration of the planned interruption, or upon expiration of a determined loss of signal duration associated with the planned interruption, retrieve buffered data traffic from storage, and may send the retrieved data traffic via the new optical fiber cable 815.

Figure 9A:
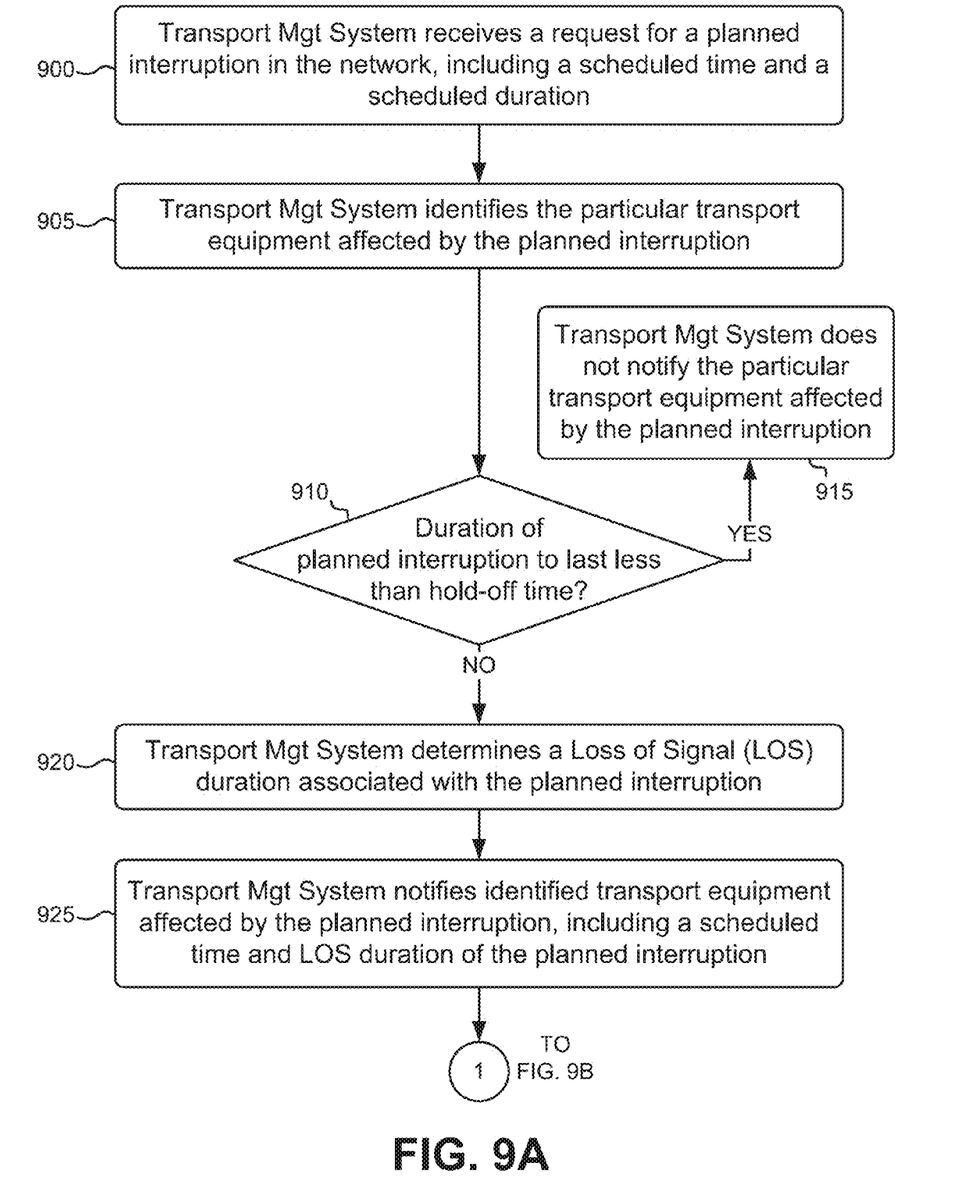
FIGS. 9A and 9B are flow diagrams that illustrate an exemplary process for notifying transport equipment in the optical network of a planned network interruption affecting one or more links connected to the notified transport equipment.
Figure 9B:
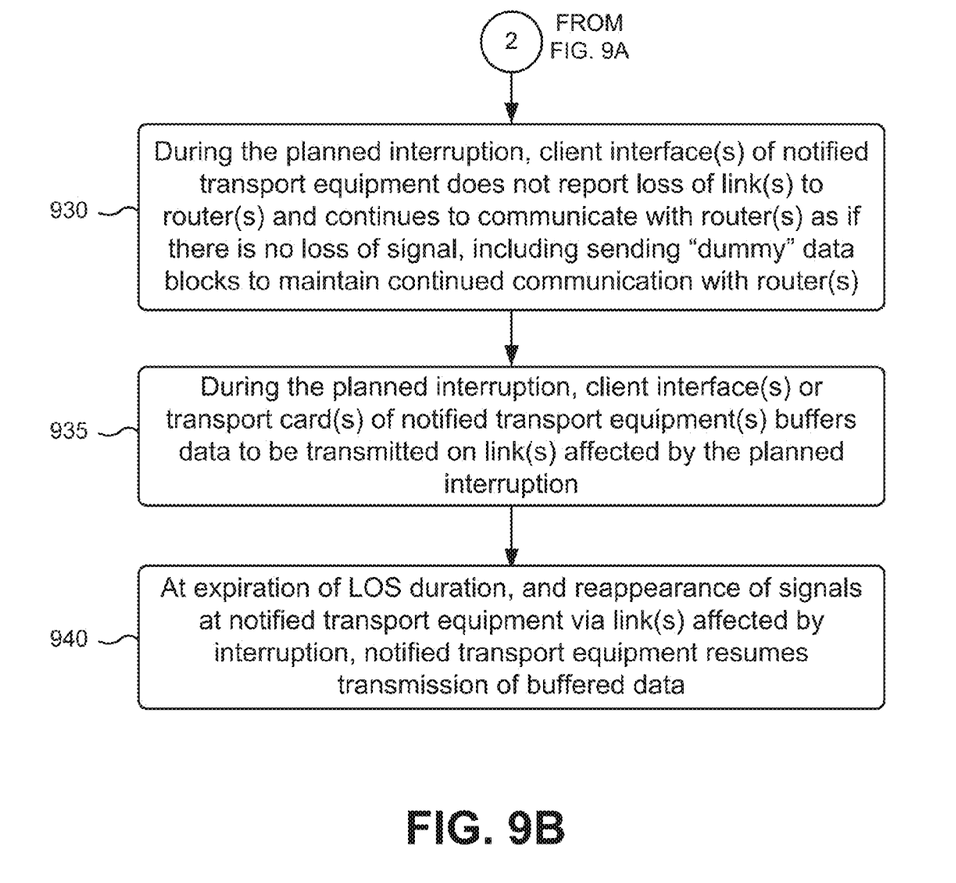

FIGS. 9A and 9B are flow diagrams that illustrate an exemplary process for notifying transport equipment in optical network 115 of a planned network interruption affecting one or more links connected to the notified transport equipment. The exemplary process of FIGS. 9A and 9B may be implemented by transport management system 110 in conjunction with transport equipment 120 of optical network 115. The exemplary process of FIGS. 9A and 9B is described below with reference to FIG. 6.

The exemplary process may include transport management system 110 receiving a request for a planned interruption in optical network 115, including a scheduled time and a scheduled duration (block 900). The request may be manually entered at transport management system 110 by an operator (e.g., a network administrator), or may be automatically received as part of an electronic network management plan that specifies a list of planned interruptions. The request may identify a particular link, a series of links, an optical fiber cable, or a series of optical fiber cables involved in the planned interruption.

Transport management system 110 identifies the particular transport equipment 120 affected by the planned interruption (block 905). Transport management system 110, based on a knowledge of a topology of optical network 115, including all of the nodes, components and interconnecting links of optical network 115, may identify the particular transport equipment 120 that are connected to the particular link, series of links, optical fiber cable, or series of optical fiber cables involved in the planned interruption. For example, referring to FIG. 6, with the receipt of a request that identifies the link(s) involved with planned interruption 620, transport management system 110 identifies a particular transport card 230-A of transport equipment A 120-A and a particular transport card 230-B of transport equipment B 120-B as being connected to the identified link(s) in optical network 115.

Transport management system 110 determines if the duration of the planned interruption is to last less than a preset hold-off time (block 910). The hold-off time may be preset by an operator of transport management system 110, and may include a period of time sufficiently short as to not warrant transport management system 110 notifying transport equipment 120 of the planned interruption. In other words, the planned interruption is not sufficiently long so as to have any kind of significant impact on data traffic being transported through transport equipment 120 affected by the planned interruption. For example, a planned interruption of less than 0.001 seconds may not result in any kind of significant impact on data traffic.

If the duration of the planned interruption is to last less than the preset hold-off time (YES—block 910), then transport management system 110 does not notify the particular equipment(s), identified in block 905, affected by the planned interruption (block 915). For example, referring to FIG. 6, if the planned interruption has a scheduled duration less than the hold-off time, transport management system 110 does not send a notification to either transport equipment A 120-A or transport equipment B 120-B notifying them of the planned interruption.

If the duration of the planned interruption is to last equal to, or longer than, the preset hold-off time (NO—block 910), then transport management system 110 determines a loss of signal (LOS) duration associated with the planned interruption (block 920). In this situation, the planned interruption is of a sufficient length as to negatively impact the data traffic and possibly cause re-routing due to optical signal loss over links affected by the planned interruption. The planned interruption, however, may be a short enough period of time that the data traffic can be adequately buffered at the affected transport equipment 120, or the amount of data that may be dropped during the length of the planned interruption due to buffer overload is considered permissible. The LOS duration may be determined based on the scheduled duration of the planned interruption received at block 900, and based on knowledge of the network topology and other factors associated with operation of the network (e.g., transport channel recovery time, optical propagation time associated with planned interruption, etc.).

Transport management system 110 notifies the transport equipment affected by the planned interruption, identified in block 905, including a scheduled time and the determined LOS duration of the planned interruption (block 925). Transport management system 110 sends a message to each transport equipment 120 identified as being affected by the planned interruption, with the message indicating the scheduled time associated with the planned interruption, and the determined LOS duration associated with the planned interruption. During the planned interruption, client interface(s) 210 of the notified transport equipment 120 does not report the loss of link(s) to router(s) 125, and continues to communicate with router(s) 125 as if there is no loss of signal, including sending "dummy" data blocks to maintain continued communication with router(s) 125 (block 930). As a result of not reporting the loss of the link(s) to the router(s) 125, and sending the "dummy" data blocks to maintain the continued communication with router(s) 125, router(s) 125 do not engage in costly re-routing at the IP or MPLS level during the relatively short planned interruption.

During the planned interruption, client interface(s) 210 or transport card(s) 230 of notified transport equipment(s) 120 buffers data to be transmitted on link(s) affected by the planned interruption (block 935). Each client interface 210 or transport card 230 of a notified transport equipment 120 has an associated data buffer (e.g., a first-in-first-out (FIFO) memory storage) in which data can be temporarily buffered during a period of time associated with the planned interruption. At expiration of the LOS duration, and reappearance of signals at notified transport equipment via link(s) affected by the interruption, the notified transport equipment 120 resumes transmission of buffered data (block 940). For example, if the LOS duration has expired and optical signals have reappeared at transport card 230-$A_1$ of transport equipment 120-A, then data traffic buffered at transport card 230-$A_1$ due to a planned interruption notification may be retrieved and transmitted on the outgoing link.

The exemplary process of FIGS. 9A and 9B may be repeated for each request for a planned network interruption received at transport management system 110. Therefore, the exemplary process of FIGS. 9A and 9B may be executed in parallel in instances having multiple simultaneous, or overlapping, planned network interruptions.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 9A and 9B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, at an optical transport equipment in an optical network, a notification indicating a planned interruption in the optical network, wherein the notification includes a time of the planned interruption and a loss of signal duration associated with the planned interruption;
    identifying one or more optical interfaces of the optical transport equipment coupled to one or more optical links affected by the planned interruption;
    sending, by the identified one or more optical interfaces of the optical transport equipment during a time period derived from the time of the planned interruption and the loss of signal duration and responsive to receiving the notification, dummy data blocks to one or more routers connected to the one or more optical interfaces such that the one or more routers do not perceive any communication interruption during the planned interruption and do not engage in a re-routing related to the planned interruption; and
    buffering, by the one or more optical interfaces during the time period, data to be transmitted on the one or more optical links affected by the planned interruption.

2. The method of claim 1, wherein the one or more optical interfaces comprises a plurality of optical interfaces, wherein the one or more optical links comprises a plurality of optical links, wherein the one or more routers comprises a plurality of routers and wherein the identifying the one or more optical interfaces comprises identifying the plurality of optical interfaces coupled to the plurality of optical links affected by the planned interruption,
    wherein sending the dummy data blocks comprises sending, by the identified plurality of optical interfaces during a time period derived from the time of the planned interruption and the loss of signal duration, the dummy data blocks to the plurality of routers connected to the plurality of optical interfaces such that the plurality of routers do not perceive any network interruption during the planned interruption and do not engage in the re-routing related to the planned interruption, and
    wherein the buffering comprises buffering, by the plurality of optical interfaces during the time period, the data to be transmitted on the plurality of optical links affected by the planned interruption.

3. The method of claim 1, wherein the notification is received from a transport management system at the optical transport equipment, and wherein the transport management system determines the optical transport equipment, among a plurality of optical transport equipments in the optical network, affected by the planned interruption.

4. The method of claim 1, further comprising:
    resuming transmission, by the one or more optical interfaces upon expiration of the time period, of the buffered data.

5. The method of claim 1, further comprising:
    instructing the identified one or more optical interfaces to not send, to the one or more routers, a report reporting any loss of link during the time period due to the planned network interruption.

6. The method of claim 1, wherein the one or more optical interfaces are coupled to one or more optical transport cards and further comprising:
    buffering, during the time period by the one or more optical transport cards instead of the one or more optical interfaces, the data to be transmitted on the one or more optical links affected by the planned interruption.

7. The method of claim 1, further comprising:
    determining a reappearance time at which optical signals reappear at the one or more optical interfaces subsequent to the planned interruption,
    wherein the time period is further derived from the reappearance time.

8. A transport equipment, comprising:
    multiple client interfaces connected to multiple router interfaces associated with at least one router;
    multiple transport cards configured to convert outgoing digital data to outgoing optical signals, and to convert incoming optical signals to incoming digital data;
    an optical multiplexer connected between the multiple transport cards and multiple optical fibers associated with an optical network; and
    a processor, connected between the multiple client interfaces and the multiple transport cards, and configured to:
        receive a message, from a transport management system, that includes a notification of a planned network interruption affecting traffic sent or received via at least one of the multiple optical fibers, wherein the message includes a scheduled time, and a scheduled duration, of the planned interruption,
        instruct one or more of the multiple client interfaces or one or more of the multiple transport cards, associated with the at least one of the multiple optical fibers, to buffer data, at the scheduled time, to be sent over the at least one of the multiple optical fibers, and
        instruct, subsequent to expiration of the scheduled duration, the one or more of the multiple client interfaces or the one or more of the multiple transport cards to retrieved buffered data and send the data towards its respective destination via the at least one of the multiple optical fibers.

9. The transport equipment of claim 8, wherein the processor is further configured to:
    instruct the one or more of the multiple client interfaces to not report any loss of link, during the scheduled duration, due to the planned network interruption to the at least one router.

10. The transport equipment of claim 9, wherein the processor is further configured to:
  instruct the one or more of the multiple client interfaces to send dummy data blocks to the router client interfaces of the at least one router during the scheduled duration of the planned network interruption.

11. The transport equipment of claim 8, wherein the processor is further configured to:
  determine, subsequent to expiration of the scheduled duration, if optical signals are being received again at the one or more of the multiple transport cards,
  wherein the instructing the one or more of the multiple client interfaces or the one or more of the multiple transport cards to retrieve buffered data and send the data towards its respective destination via the at least one of the multiple optical fibers is based on the optical signals being received again at the one or more of the multiple transport cards.

12. A non-transitory computer-readable medium containing instructions executable by at least one processor of an optical transport equipment, the computer-readable medium comprising:
  one or more instructions for receiving, at the optical transport equipment in an optical network, a notification indicating a planned interruption in the optical network, wherein the notification includes a time of the planned interruption and a loss of signal duration associated with the planned interruption;
  one or more instructions for identifying one or more optical interfaces of the optical transport equipment coupled to one or more optical links affected by the planned interruption;
  one or more instructions for causing the identified one or more optical interfaces to send, during a time period derived from the time of the planned interruption and the loss of signal duration and responsive to receiving the notification, dummy data blocks to one or more routers connected to the one or more optical interfaces such that the one or more routers do not perceive any communication interruption during the planned interruption and do not engage in a re-routing related to the planned interruption; and
  one or more instructions for causing, by the one or more optical interfaces, during the time period, buffering of data to be transmitted on the one or more optical links affected by the planned interruption.

13. The non-transitory computer-readable medium of claim 12, wherein the one or more optical interfaces comprises a plurality of optical interfaces, wherein the one or more optical links comprises a plurality of optical links, and wherein the one or more routers comprises a plurality of routers, and further comprising:
  wherein the one or more instructions for identifying the one or more optical interfaces comprises one or more instructions for identifying the plurality of optical interfaces of the optical transport equipment coupled to the plurality of optical links affected by the planned interruption,
  wherein the one or more instructions for sending the dummy data blocks comprises one or more instructions for sending, by the identified plurality of optical interfaces of the optical transport equipment during a time period derived from the time of the planned interruption and the loss of signal duration, the dummy data blocks to the plurality of routers connected to the plurality of optical interfaces such that the plurality of routers do not perceive any network interruption during the planned interruption and do not engage in the re-routing related to the planned interruption, and
  wherein the one or more instructions for buffering comprises one or more instructions for buffering, during the time period at the plurality of optical interfaces, the data to be transmitted on the plurality of optical links affected by the planned interruption.

14. The non-transitory computer-readable medium of claim 12, wherein the notification is received from a transport management system at the optical transport equipment, and wherein the transport management system identifies the optical transport equipment, among a plurality of optical transport equipments in the optical network, affected by the planned interruption.

15. The non-transitory computer-readable medium of claim 12, further comprising:
  one or more instructions for causing the one or more optical interfaces, upon expiration of the time period, to resume transmission of the buffered data.

16. The non-transitory computer-readable medium of claim 12, further comprising:
  one or more instructions for instructing the identified one or more optical interfaces to not send, to the one or more routers, a report reporting any loss of link during the time period due to the planned network interruption.

17. The non-transitory computer-readable medium of claim 12, wherein the one or more optical interfaces are coupled to one or more optical transport cards and further comprising:
  one or more instructions for instructing, during the time period, the one or more transport cards, instead of the one or more optical interfaces, to buffer the data to be transmitted on the one or more optical links affected by the planned interruption.

18. The non-transitory computer-readable medium of claim 12, further comprising:
  one or more instructions for determining a reappearance time at which optical signals reappear at the one or more optical interfaces subsequent to the planned interruption, wherein the time period is further derived from the reappearance time.

19. The method of claim 1, further comprising:
  determining, subsequent to expiration of the planned interruption, if optical signals are being received again at the identified one or more optical interfaces via the one or more optical links affected by the planned interruption;
  retrieving, if the optical signals are being received again at the identified one or more optical interfaces, the buffered data; and
  resuming transmission, by the one or more optical interfaces via the one or more optical links, of the buffered data.

20. The non-transitory computer-readable medium of claim 12, further comprising:
  one or more instructions for determining, subsequent to expiration of the planned interruption, if optical signals are being received again at the identified one or more optical interfaces via the one or more optical links affected by the planned interruption;
  one or more instructions for retrieving, if the optical signals are being received again at the identified one or more optical interfaces, the buffered data; and one or more instructions for causing the transmission, by the one or more optical interfaces, of the buffered data to be resumed via the one or more optical links.

\* \* \* \* \*